(12) United States Patent
Yahara

(10) Patent No.: US 9,849,606 B2
(45) Date of Patent: Dec. 26, 2017

(54) DEVICE FOR FORMING EXPANDED HOLE SECTION

(71) Applicant: Mokukouzou System Co., Ltd., Hita-shi (JP)

(72) Inventor: Isamu Yahara, Hita (JP)

(73) Assignee: MOKUKOUZOU SYSTEM CO., LTD., Oaza Higashiarita, Hita-Shi (JP)

( * ) Notice: Subject to any disclaimer, the term of this patent is extended or adjusted under 35 U.S.C. 154(b) by 0 days.

(21) Appl. No.: 15/123,625

(22) PCT Filed: Mar. 4, 2014

(86) PCT No.: PCT/JP2014/055425
§ 371 (c)(1),
(2) Date: Sep. 2, 2016

(87) PCT Pub. No.: WO2015/132874
PCT Pub. Date: Sep. 11, 2015

(65) Prior Publication Data
US 2017/0072585 A1    Mar. 16, 2017

(51) Int. Cl.
*B23B 29/034*    (2006.01)
*B27C 3/08*    (2006.01)
(Continued)

(52) U.S. Cl.
CPC ............... *B27C 3/08* (2013.01); *B23B 5/40* (2013.01); *B23B 29/03457* (2013.01);
(Continued)

(58) Field of Classification Search
CPC ... B23B 29/03457; B23B 29/346; B23B 5/36; B23B 5/40; B23B 51/0045; B27G 15/00; B27G 15/02; B27C 3/08; Y10T 82/12
See application file for complete search history.

(56) References Cited

U.S. PATENT DOCUMENTS 2,040,761 A * 5/1936 Rothschmitt ........... B23B 41/12
                                                    72/123
4,309,925 A * 1/1982 Mottershead ............. B23B 5/40
                                                    82/1.2
4,945,792 A * 8/1990 Gardner .................. B23B 29/02
                                                    82/1.2
(Continued)

FOREIGN PATENT DOCUMENTS

CN    2686772 Y    3/2005
DE    2731901 A1   2/1979
(Continued)

*Primary Examiner* — Daniel Howell
(74) *Attorney, Agent, or Firm* — Lucem, PC; Heedong Chae

(57) ABSTRACT

A hole expansion device includes a cutting portion main, body formed to have a diameter for the cutting portion, main body to be housed within a joint hole and including a cutting blade tool movable in a range from a housed position at which a blade is housed within a diameter for the cutting portion main body to an extended position at which the blade projects out of the diameter, an advancing and retracting member that is constructed to move in an axial direction by an external force and rotate about an axis of the advancing and retracting member, and a link mechanism that converts an advancing and retracting movement of the advancing and retracting member into a rotational movement of the cutting blade tool.

9 Claims, 14 Drawing Sheets

(51) Int. Cl.
*B23B 5/40* (2006.01)
*B27M 3/00* (2006.01)
*B23B 51/00* (2006.01)
*B23B 45/02* (2006.01)

(52) U.S. Cl.
CPC .......... *B23B 45/02* (2013.01); *B23B 51/0045* (2013.01); *B27M 3/0046* (2013.01); *B27M 3/0073* (2013.01); *B27M 3/0086* (2013.01); *B23B 2251/68* (2013.01); *B23B 2270/30* (2013.01); *Y10T 82/12* (2015.01)

(56) References Cited

U.S. PATENT DOCUMENTS 5,209,145 A * 5/1993 Baudermann ............. B23B 5/40
 408/159
5,967,007 A * 10/1999 Scheer ...................... B23B 5/40
 82/1.2
8,015,902 B2 * 9/2011 Hyatt ........................ B23B 5/36
 82/1.11

FOREIGN PATENT DOCUMENTS

| DE | 102005054717 B3 | 12/2006 |
|---|---|---|
| EP | 223152 A1 * | 5/1987 |
| JP | 52-32186 A | 3/1977 |
| JP | 4-360702 A | 12/1992 |
| JP | 10-34406 A | 2/1998 |
| JP | 2004-360458 A | 12/2004 |
| JP | 2007-55260 A | 3/2007 |
| JP | 2010-253898 A | 11/2010 |

* cited by examiner

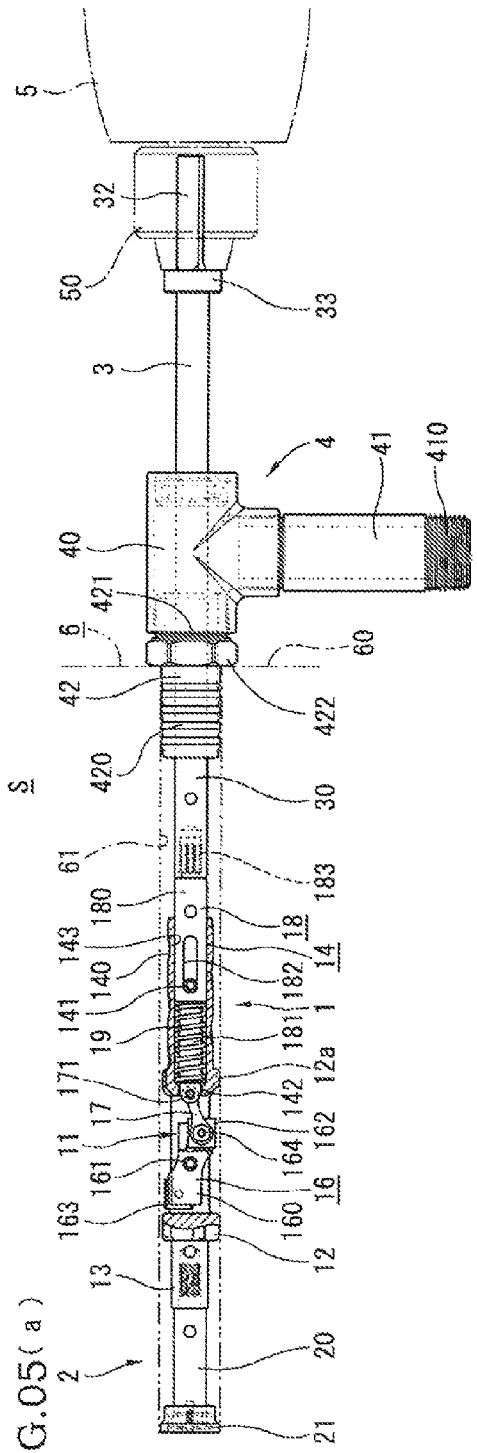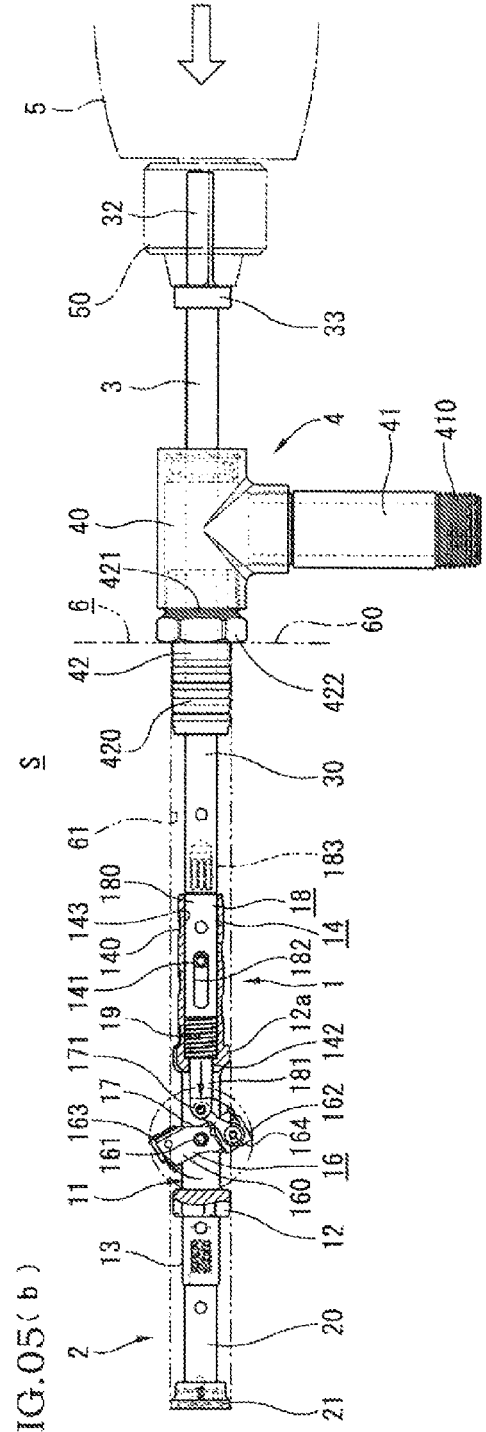

DEVICE FOR FORMING EXPANDED HOLE SECTION

TECHNICAL FIELD

The present invention relates to a hole expansion forming device. More specifically, the present invention relates to a device for forming a hole expansion to be filled with an adhesive agent in an inner wall of a joint hole formed to have a required depth in a joint surface of a wood member, configured to enable smooth movement when turning of a cutting blade when forming a hole expansion and stabilize movement of the cutting blade when cutting.

BACKGROUND ART

In a building having wood structures including beams and pillars, etc., intentionally exposed to be utilized as a design, a joint structure that enables wood materials to be firmly joined together while preventing a joint body from being exposed to the surface is adopted. In this joint structure, for example, a hole expansion is formed in an inner wall of a hole provided in a butt end of each of to-be-joined wood materials to be joined, the respective butt ends are butted against each other, a joint body such as a threaded rod, etc., is housed in and across the holes, and an adhesive agent is filled in the respective holes and cured to join the wood materials together in such a manner that the joint body that is integrated with the cured adhesive agent, is prevented from coming out.

As such a device for forming a hole expansion in an inner wall of a hole of a wood member, there is a "device for forming an expansion in a hole" disclosed in Patent Literature 1. This device includes an insertion pipe to be inserted in a joint hole, a rotor which passes through the insertion pipe and is pivotally supported rotatably, and to which an electric motor is connected, a cutting blade attached to the rotor by a central shaft turnably between inside and outside of the insertion pipe, a tip end bearing that pivotally supports the rotor at the tip end of the rotor, a suction pipe to discharge chips produced inside the joint hole, and a cutting blade operation tool that turns the cutting blade in at least a range from an angle at which the cutting blade is housed inside the joint hole to an angle at which the cutting blade becomes perpendicular to the rotor, and the device can form, as a hole, expansion, a substantially spherical space to be filled with an adhesive agent in the inner wall of the joint hole formed in the joining wood material.

PRIOR ART DOCUMENT

Patent Literature

Patent Literature 1: Japanese Published Unexamined Patent Application No. 2010-253898

SUMMARY OF THE INVENTION

Problem to be Solved by the Invention

The device described in Patent Literature 1 is sufficiently useful in the point that a hole expansion can be easily and swiftly formed in a joint hole of a joining wood material. However, through actual works using the above-described device, it has been found that there is room for improvement in the following points.

That is, in a mechanism that turns a cutting blade by pushing it with a cutting blade operation tool, great friction occurs between these, and smooth movement may not be obtained. In particular, as the cutting blade turns from a state where it is housed in an insertion pipe, a portion pushed by a pushing port ion comes closer to the central shaft, and when it approaches a turning position at which a largest cutting resistance is applied to the cutting blade (the position shown in FIG. 5(b) of Patent Literature 1), a considerably great force is applied to the cutting blade from the cutting blade operation tool and a wood cutting portion. However, structurally, it is difficult to further increase the blade width of the cutting blade, and a sufficient strength of the cutting blade is hardly secured, so that for the reason described above, the cutting blade is quickly damaged, and its replacement frequency tends to increase.

Further, the cutting blade turns by being pushed by the cutting blade operation tool during cutting, however, the cutting blade operation tool is only in contact with the cutting blade, and thus the movement in the turning direction of the cutting blade is free to some extent, and this easily causes the movement to become bumpy. Therefore, when the cutting blade cuts the hole expansion while rotating, the cutting blade hardly stabilizes, so that there is a possibility that the cutting blade is subjected to an unexpected great load and broken, and the finish of the inner surface of the hole expansion is uneven and causes trouble in filling of an adhesive agent.

Object of the Invention

The present invention was made, in view of the above-described circumstances, and an object thereof is to provide a hole expansion forming device that realizes smoother movement when turning of a cutting blade when forming a hole expansion and stabilizes movement in a rotating direction of the cutting blade when cutting, in a device for forming a hole expansion to be filled with an adhesive agent in an inner wall of a joint hole formed to have a required depth in a joint surface of a wood member.

Means for Solving the Problem (1) The present invention provides a hole expansion forming device including: a cutting portion main body formed to have a diameter for the cutting portion main body to be housed in a joint hole and including a cutting blade tool movable in a range between a housed position at which a blade is housed within the diameter of the cutting portion main body and an extended position at which the blade projects out of the diameter of the cutting portion main body, an advancing and retracting member that is constructed to move in an axial direction by an external force and rotate about an axis of the advancing and retracting member, and a link mechanism that converts an advancing and retracting movement of the advancing and retracting member into the rotational movement of the cutting blade tool; a tip portion bearing that, is provided on a tip end of the cutting portion main body, and serves as a tip end side bearing when being housed in an inner portion of the joint hole; and a torque transmitting element to transmit a torque about the axis of the advancing and retracting member to the advancing and retracting member.

(2) The present invention can be configured so that the cutting blade tool has blades on both ends in a longitudinal direction and rotates around a turning center of an intermediate portion.

In this case, when the cutting blades are turned in a range between a housed position at which the blades are housed within a diameter for the cutting portion main body to an extended position at which the blades project out of the diameter by the link mechanism that moves the cutting blade tool, a hole expansion having a spherical space can be formed.

(3) The present invention can be configured so that the advancing and retracting member includes a biasing body that biases the cutting blade tool, interlocked with the advancing and retracting member, in a direction to make the blade being housed within the diameter of the cutting portion main body, In this case, after the blade of the cutting blade tool interlocked with the advancing and retracting member is extended out of the diameter by moving the advancing and retracting member by an external force, the cutting blade tool automatically restores to its former state in which the blade is housed within the diameter due to a biasing force of the biasing body such as a spring, etc., so that a work of forming a hole expansion is easily performed.

(4) The present invention can be configured to include a spiral groove portion whose spiral direction is a discharging direction on an outer circumferential portion of the cutting portion main body.

In this case, chips cut by the blade of the cutting blade tool by rotating the cutting portion main body can be guided in the discharge direction by the spiral groove portion and smoothly and efficiently discharged to the outside of the joint hole.

(5) The present invention can be configured so that a runout preventive portion, having a diameter smaller than that of the joint, hole and larger than that of other portions of the cutting portion main body, is formed on an outer circumferential portion of the cutting portion main body.

In this case, at the time of a hole expansion cutting work, the runout preventive portion can prevent or suppress axial runout of the cutting portion main body in cooperation with the tip portion bearing. Accordingly, a hole expansion to be formed in the inner wall of the joint hole can be more accurately and efficiently machined.

(6) The present invention can be configured so that the tip portion bearing is constructed to be attached to a depth adjusting adapter selected from a plurality of depth adjusting adapters, which are attachable to and removable from a tip end of the cutting portion main body, having different, lengths.

In this case, by replacement with an appropriate one of depth adjusting adapters with different lengths to be attached to the tip end of the cutting portion main body, a distance from an inner end portion of the joint hole to the cutting blade tool can be adjusted, so that a hole expansion can be formed at a plurality of positions on the inner wall of the joint hole.

(7) The present invention can be configured so that the torque transmitting element includes an extension shaft having a rotary shaft, connecting element which is connectable
to the advancing and retracting member of the cutting portion main body and to which a rotary shaft of an electric motor is connected.

In this case, by connecting the extension shaft to the advancing and retracting member and connecting a rotary shaft of an electric motor to the extension shaft via the rotary shaft connecting element, the cutting portion main body can be rotated by a rotary drive force of the electric motor. Also, when, an operator holds the electric motor and advances and retracts the extension shaft in an axial direction, the cutting blade tool can be turned in the range from the housed position at which the blade is housed within a diameter for the cutting portion train body to the extended position at which the blade projects out of the diameter.

(8) The present invention can. be configured so that the torque transmitting element includes an extension shaft, having a rotary shaft connecting element which is connectable to the advancing and retracting member of the cutting portion main body and to which a rotary shaft of an electric motor is connected, and a rear portion bearing that pivotally supports the extension shaft itself rotatably.

In this case, in addition to the operation described in (7) above, at the time of a hole expansion cutting work, by housing the rear portion bearing in the inside of the joint hole or the inside of a handle case described later, the rear portion bearing can prevent or suppress axial runout of. the cutting portion main body in cooperation with the tip portion bearing. Accordingly, a hole expansion to be formed in the inner wall of the joint hole can be more accurately and efficiently machined.

(9) The present invention can be configured to include a handle case that directly or indirectly pivotally supports rotation of the cutting portion main body, and the handle case has a cylinder portion that can be fitted in the joint hole and a suction pipe connecting element to which a suction pipe to suction air and chips inside the joint hole through the cylinder portion is connected.

In this case, chips produced inside the joint hole along with formation of a hole expansion can he collected through the suction pipe leading to a suction pump or the like, so that chips can be prevented from scattering and being dispersed in the air at a working area, and an excellent work environment can be maintained.

(Operation)

Operation of the hole expansion forming device according to the present invention is described.

First, by connecting a rotary shaft of an electric motor, etc., via the torque transmitting element, transmission of a torque to the advancing and retracting member and the cutting portion main body is enabled.

Next, into a joint hole with a required depth opened by boring a wood surface of a butt end, etc., of a joining wood material by using a wood wimble, the tip portion bearing and the cutting portion main body are inserted, and the tip portion bearing is brought into contact with and housed in an inner end portion of the joint hole.

The advancing and retracting member and the cutting portion main body are rotated inside the joint hole by the electric motor, etc. The tip end side of the cutting portion main body is pivotally supported rotatably by the tip portion bearing, so that the cutting portion main body can smoothly rotate. Then, the advancing and retracting member is advanced and retracted by moving the electric motor, etc., in the axial direction of the rotary shaft, etc. Accordingly, the cutting blade tool moves by turning, etc., in the range from the housed position at which the blade is housed within a diameter for the cutting portion main body to an extended position at which the blade projects out of the diameter, the inner wall of the joint hole is cut by the rotating blade, and accordingly, a hole expansion having a larger space than the initial inner-diameter space is formed.

The cutting blade tool is structured so as to be moved via a link mechanism, and movement such as turning, etc., of the cutting blade tool is smoothly performed. By interposing a link between the cutting blade tool and the advancing and retracting member, movement of the advancing and retracting member is always reflected in movement of the cutting blade tool, so that the conventional bumpy movement does not occur, and the movement of the cutting blade in the rotating direction when cutting can be stabilized.

Effect of the Invention

The present invention can provide a hole expansion forming device that realizes smoother movement when turning of a cutting blade when forming a hole expansion and stabilizes movement in a rotating direction of the cutting blade when cutting, in a device for forming a hole expansion to be filled with an adhesive agent in an inner wall of a joint hole formed to have a required depth in a joint surface of a wood member.

BRIEF DESCRIPTION OF THE DRAWINGS

FIGS. 3 show a device main body of the hole expansion forming device when cutting blades are housed.

FIG. 5 show structures of the respective mechanical portions of the hole expansion forming device, and FIG. 5(a) is a sectional explanatory view showing a state where blades of a cutting blade tool are housed, and FIG. 5(b) is a sectional explanatory view showing a state where the blades of the cutting blade tool project to positions corresponding to a maximum diameter.

FIG. 6 show a structure of a mechanical portion that turns the cutting blade tool.

BEST MODE FOR CARRYING OUT THE INVENTION

Figure 1:
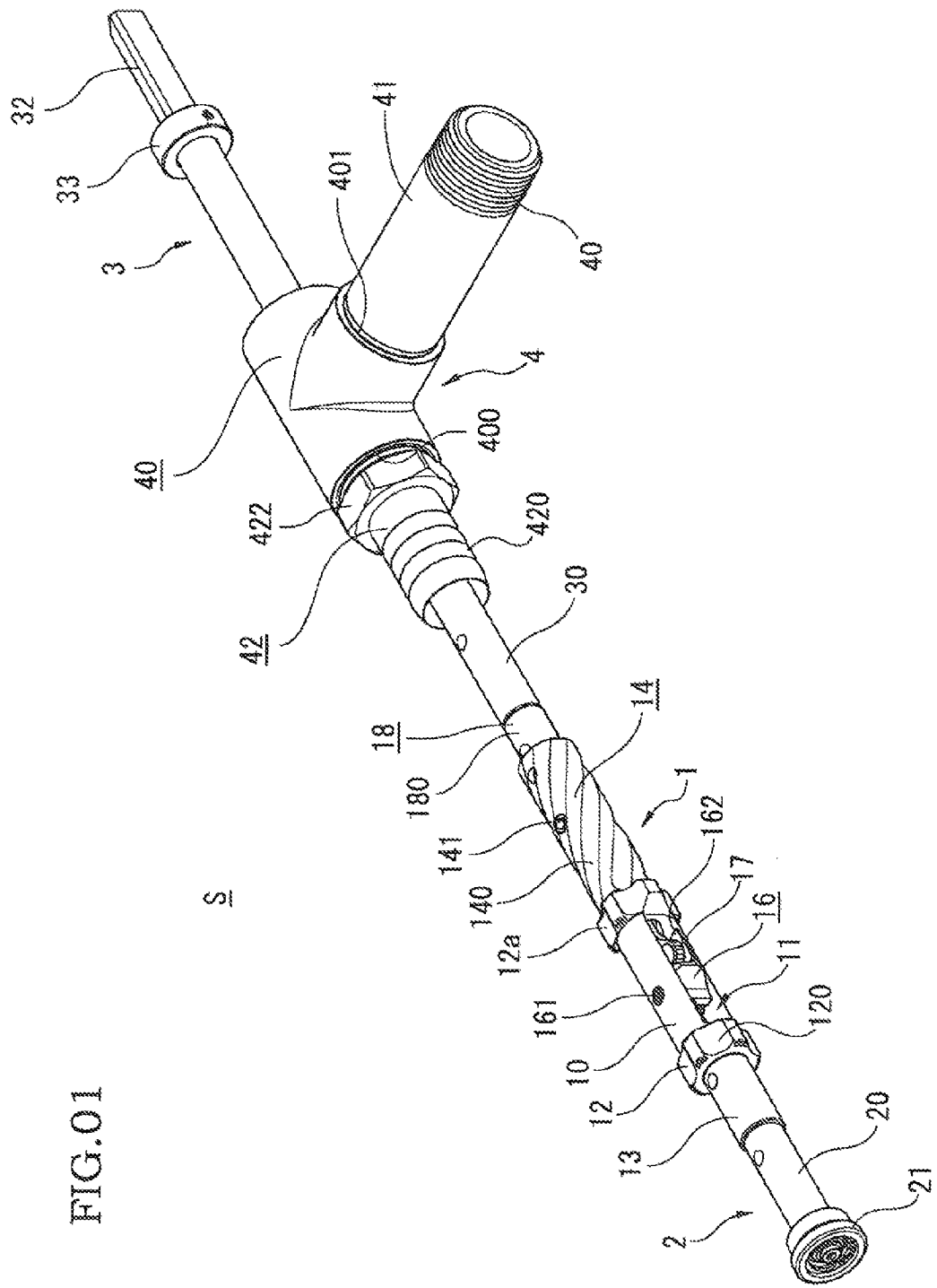
FIG. 1 is a perspective view showing an embodiment of a hole expansion forming device according to the present invention.
Figure 2:
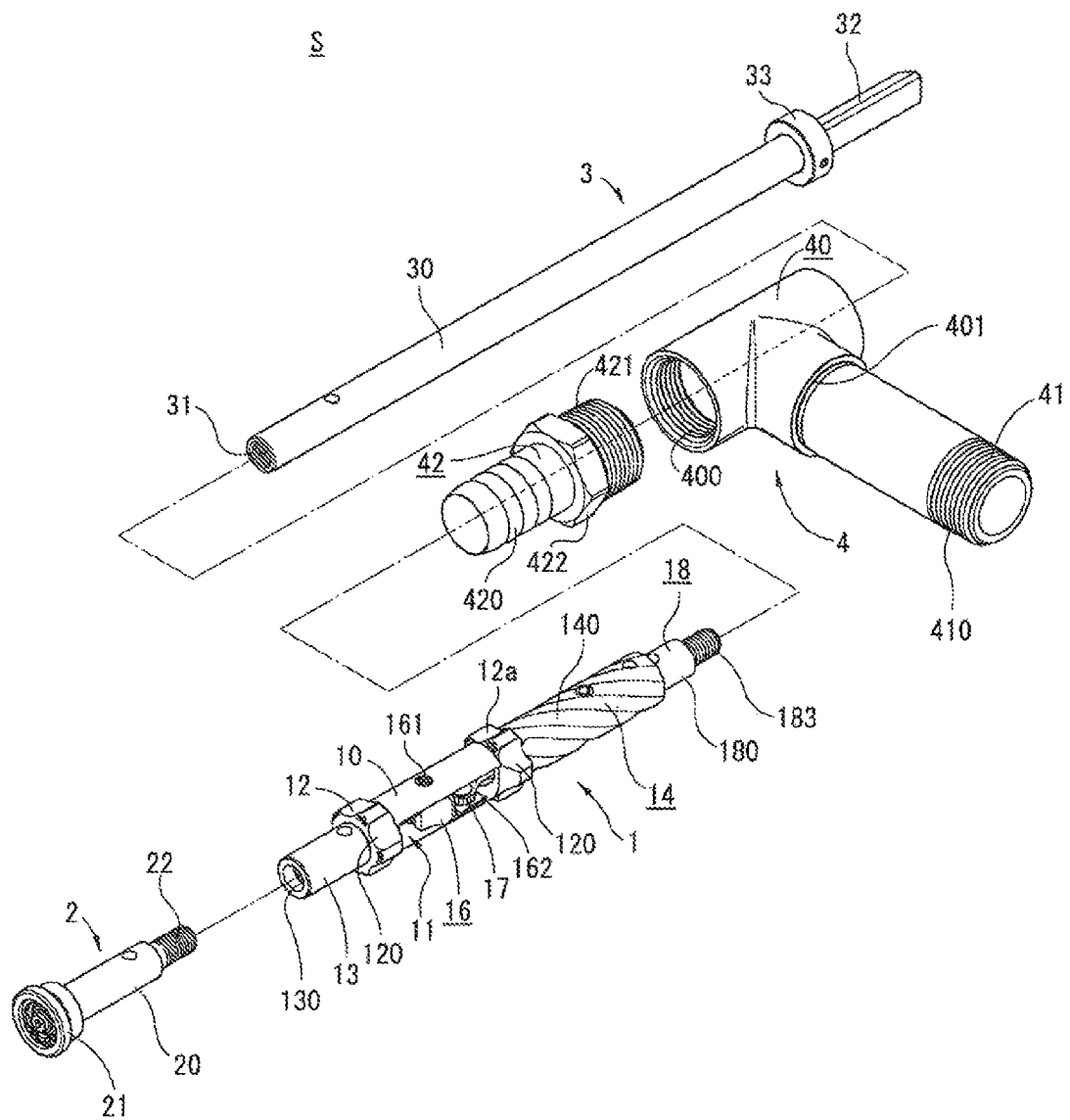
FIG. 2 is an exploded perspective view of the hole expansion, forming device shown in FIG. 1.
Figure 3A:
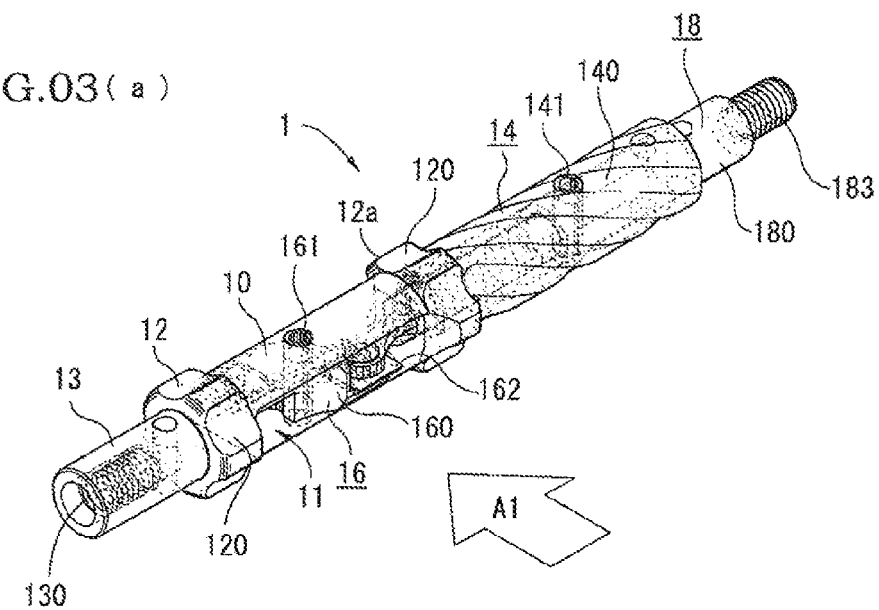
FIG. 3(a) is a perspective view.
Figure 3B:
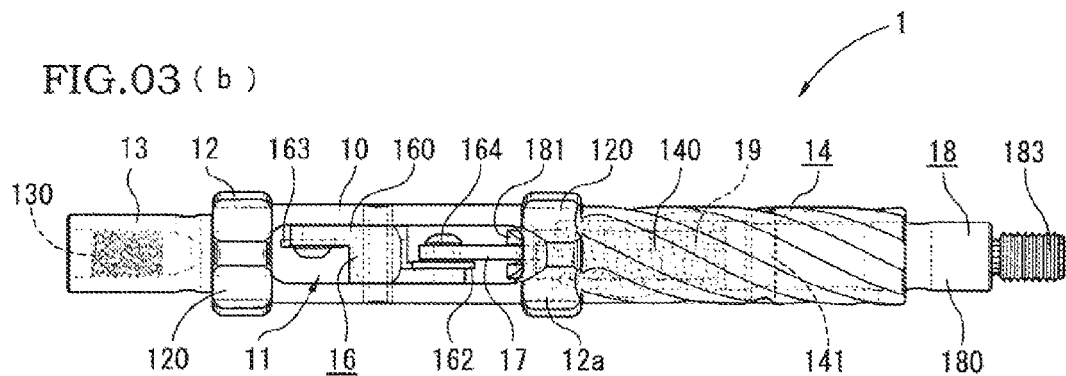
FIG. 3(b) is an explanatory view viewed from the arrow A1 in FIG. 3(a).
Figure 4A:
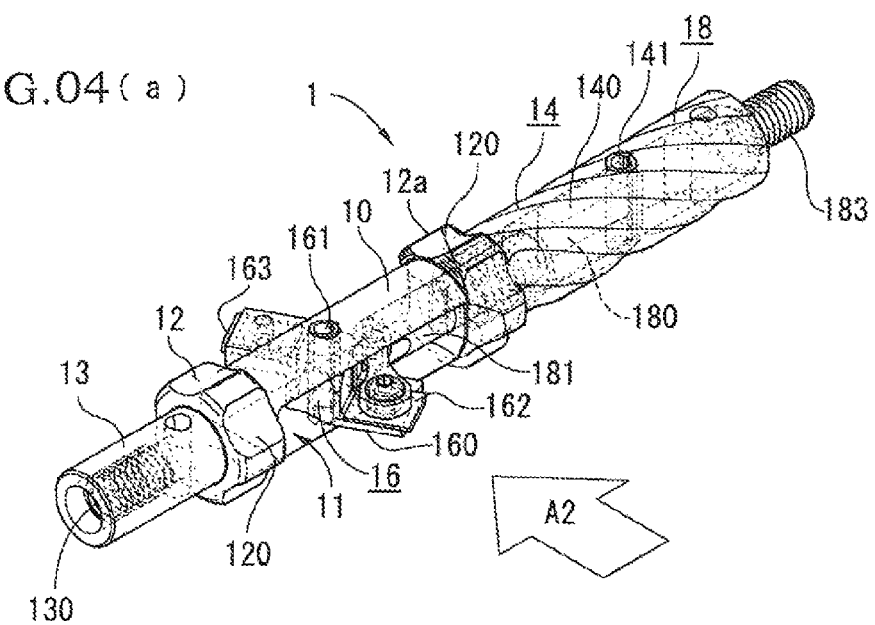
FIG. 4(a) is a perspective view and FIG. 4 (b) is an explanatory view viewed from the arrow A2 in FIG. 4(a).
Figure 4B:
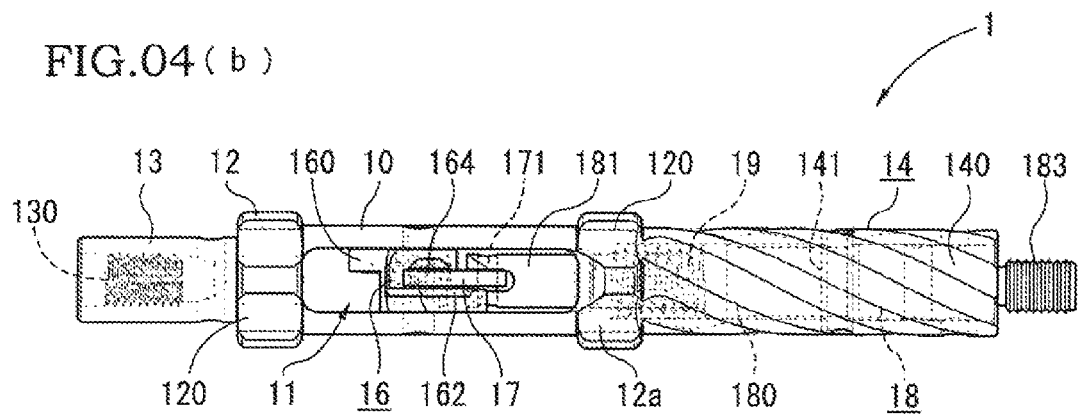
FIGS. 4 show a device main body of the hole expansion forming device when cutting blades project.
Figures 6A, 6B:
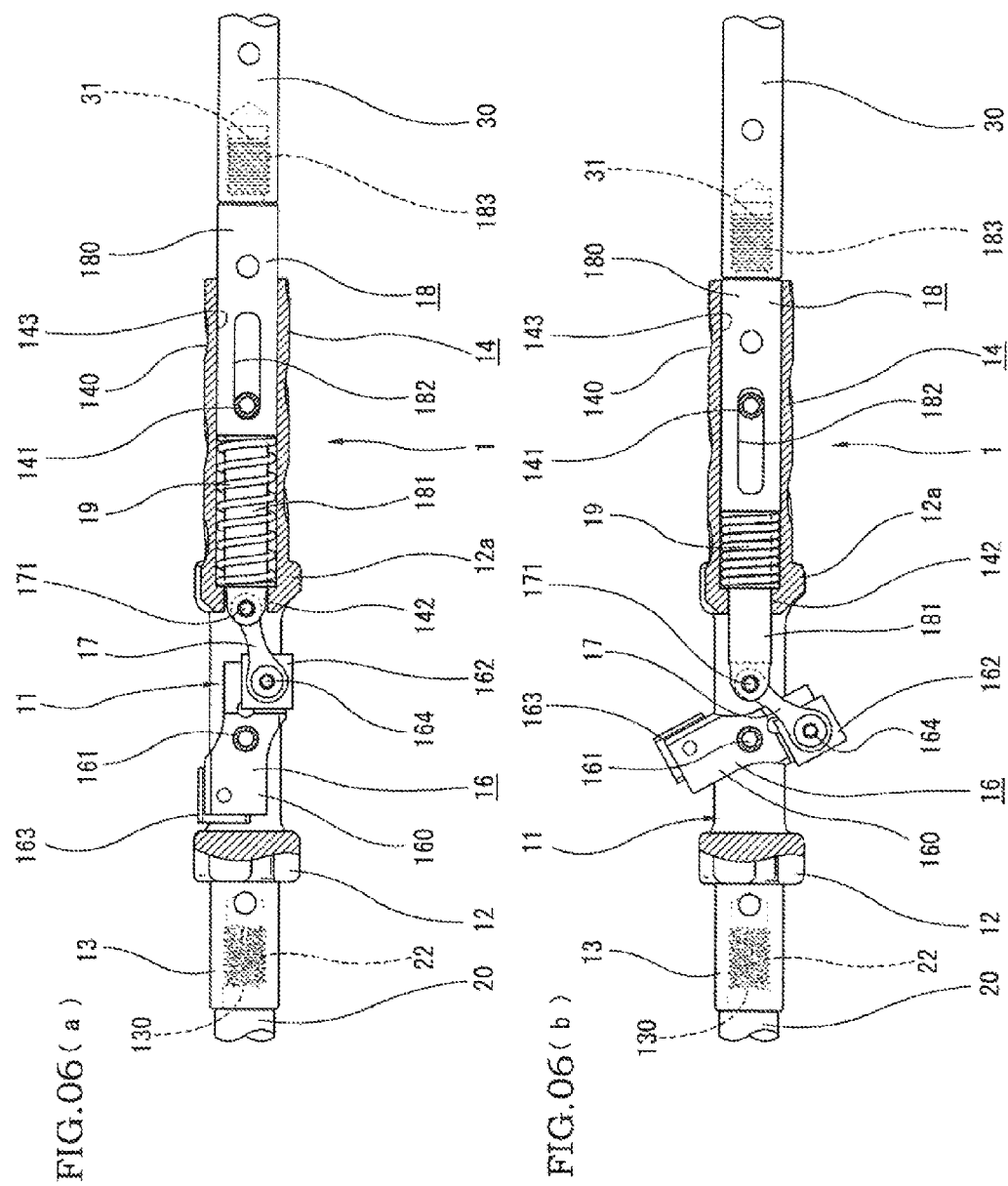
FIG. 6(a) is a sectional explanatory view showing a state where the blades of the cutting blade tool are housed.
FIG. 6(b) is a sectional explanatory view showing a state where the blades of the cutting blade tool-project to the positions corresponding to the maximum diameter.

The present invention is described in detail based on an embodiment shown in the drawings.

FIG. 1 to FIG. 6 are referred to.

A hole expansion forming device S is a device for forming hole expansions 62 and 63 being substantially spherical space portions in an inner wall of a joint hole 61 formed to have a required depth in a butt end 60 of a joining wood material 6 to be used in a wood structural body (refer to FIG. 11 described later).

The hole expansion forming device S is made of metal, and includes a cutting portion main body 1, a depth adjusting adapter 2, an extension shaft 3, and a handle case 4.

In the following description, the tip side (or front side) is shown on the left side in each drawing, and the rear side is shown on the right side in each drawing.

(Cutting Portion Main Body 1)

The cutting portion main body 1 has a housing body 10 whose sectional outer shape is substantially circular. On a tip side of the housing body 10, a tip portion connecting shaft 13 having a diameter slightly smaller than the housing body 10 is formed. On a rear side of the housing body 10, a cylinder 14 having about the same diameter as that of the housing body 10 is formed. The housing body 10, the tip portion connecting shaft 13, and the cylinder 14 are structured so that their central axes are in the same straight line.

At a border portion between the housing body 10 and the tip portion connecting shaft 13 and a border portion between the housing body 10 and the cylinder 14, runout preventive portions 12 and 12a are formed, respectively. On each of the runout preventive portions 12 and 12a, a plurality of recesses 120 are provided in the circumferential direction to allow air and chips to pass through, and an outer diameter of a convex portion (shown without a reference symbol) is set to be slightly smaller than an inner diameter of the joint hole 61 and slightly larger than diameters of the housing body 10 and the cylinder 14 at other portions.

At a central portion of a tip end surface of the tip portion connecting shaft 13, a threaded hole 130 is formed. To the threaded hole 130, a depth adjusting adapter 2 described later is connected by screwing a threaded portion 22 therein.

In the housing body 10, a housing space 11 is formed by cutting an intermediate portion in a diametrical direction of the portion between, the runout preventive portions 12 and 12a in an axial direction with a constant width. The housing space 11 is formed to penetrate through both sides of an outer circumferential surface including both ends of a diametrical line of the housing body 10.

The cylinder 14 is a substantially cylindrical body, and its rear side is opened while keeping the size of a diameter of an inner diameter portion 143. On an outer circumferential surface of the cylinder 14, a spiral groove portion 140 whose spiral direction is a discharging direction is formed. Here, the spiral direction being a discharge direction means a spiral, direction in which the spiral groove portion 140 appears to move rearward when the cutting portion main body 1 is rotated in a predetermined direction by an electric motor 5.

A through hole 142 having a smaller inner diameter than the other portion (inner diameter portion 143) is provided to penetrate through a front side of the cylinder 14 so as to communicate with the housing space 11. Accordingly, at a border portion between the inner diameter portion 143 and the through hole 142, a stepped portion (shown without a reference symbol) is formed. With this stepped portion, an end portion of a coil spring 19 described next engages.

In a front side of the inside of the inner diameter portion 143 of the cylinder 14, a coil spring 19 that serves as a biasing body is housed. A diameter of the coil spring 19 is slightly smaller than the inner diameter of the inner diameter portion 143, and a length in a normal state is approximately ½ of the length of the inner diameter portion 143. The coil spring 19 is housed in the inner diameter portion 143 by engaging the tip end with the stepped portion between the inner diameter portion 143 and the through hole 142 as described above.

In the inner diameter portion 143, an advancing and retracting member 18 is housed together with the coil spring 19. The advancing and retracting member 18 has, on a rear portion side, a large-diameter portion 180 having a slightly smaller diameter than the inner diameter portion 143, and on a tip portion side, a small-diameter portion 181 having a slightly smaller diameter than the inner diameter of the coil spring 19. At a rear end of the large-diameter portion 180, a threaded rod 183 constituting the torque transmitting element is formed.

A rear end of the coil spring 19 is engaged with a stepped portion (shown without a reference symbol) at a border portion between the small--diameter portion 181 and the large-diameter portion 180 of the advancing and retracting member 18, and the small-diameter portion 181 is inserted to penetrate through the coil spring 19 and the through hole 142. Accordingly, by sliding the large-diameter portion 180 along the inner diameter portion 143 and sliding the small-diameter portion 181 along the through hole 142, the advancing and retracting member 18 can advance and retract while being subjected to a biasing force of the coil spring 19.

Further, in the large-diameter portion 180 of the advancing and retracting member 18, a slide, hole 182 is formed to penetrate through both sides of an outer circumferential surface including both ends of a diametrical line of the large-diameter portion 180. To a substantially intermediate portion in the length direction of the cylinder 14, a guide pin 141 penetrating through the cylinder 14 in a diametrical line direction is fixed. The advancing and retracting member 18 is set by fitting the slide hole 182 to the guide pin 141 slidably.

Accordingly, the advancing and retracting member 18 advances and retracts along the axial direction of the cylinder 14, and rotates integrally with the cylinder 14 about the axis of the advancing and retracting member. The length of the slide hole 182 is set so that, when the advancing and retracting member 18 advances and retracts by this stroke, a cutting blade tool 16 described later is movable in a range from a housed position at which respective blade bodies 162 and 163 of the cutting blade tool 16 are housed within the diameter of the housing body 10 (refer to FIG. 5(a)) to a position at which the respective blade bodies 162 and 163 project out of the diameter of the housing body 10 and define a maximum diameter (refer to FIG. 5(b)).

In the housing space 11 described above, the cutting blade tool 16 is housed. The cutting blade tool 16 has a turning body 160. The turning body 160 has a central bearing portion (shown without a reference symbol) pivotally supported turnably by a shaft pin 161 fixed to penetrate through the housing space 11 in a diametrical line direction. Wing portions (shown without reference symbols) on both sides in the length direction of the turning body 160 are provided substantially in contact with a bottom surface and a top surface (both of which are shown without reference symbols) forming the housing space 11.

To inner surface sides of tip end portions of the respective wing portions, square blade bodies 162 and 163 are removably screwed. All four sides of each of the blade bodies 162 and 163 serve as cutting parts, and by using two corner portions at positions diagonal to each other while switching them as a cutting portion tip end, the blade body can be used twice in total.

A screw 164 (refer to FIG. 6) to fix one blade body 162 positioned on the rear portion side and a tip end portion of the small-diameter portion 181 of the advancing and retracting member 18 are connected via a link 17. One end side of the link 17 is connected turnably to one wing portion via a set screw 164, and the other end side is put in a gap of a two-split tip end of the small-diameter portion 181 and connected turnably via a shaft pin 171.

Accordingly, when the advancing and retracting member 18 advances and retracts by a stroke restricted in relation to the guide pin 141 and the slide hole 182, as described above, the cutting blade tool 16 can be moved in the range from the housed position at which the respective blade bodies 162 and 163 of the cutting blade tool 16 are housed within the diameter of the housing body 10 to a position at which the blade bodies 162 and 163 project out of the diameter of the housing body 10 and define a maximum diameter. In a normal state (when the advancing and retracting member 18 is at a retracted position due to a biasing force of the coil spring 19), the respective blade bodies 162 and 163 are at the housed position.

(Depth Adjusting Adapter 2)

The depth adjusting adapter 2 has a shaft rod 20 with a required length. At a rear end of the shaft rod 20, a threaded rod 22 that is screwed in the threaded hole 130 of the tip portion connecting shaft 13 is formed. To a tip end of the shaft rod 20, a tip portion bearing 21 is attached. The tip portion bearing 21 is a ball bearing, and the shaft rod 20 is rotatable in a state where an outer race of the tip portion bearing 21 is fixed or substantially fixed.

The depth adjusting adapter 2 can be connected by screwing the threaded rod 22 into the threaded hole 13 of the tip portion connecting shaft 13, and is attachable to and removable from the cutting portion main body 1. As the depth adjusting adapter 2, a plurality of depth adjusting adapters with different shaft rod lengths (not shown) are prepared in advance, and one depth adjusting adapter selected from among these as necessary is used.

(Extension Shaft 3)

The extension shaft 3 has a shaft 30 with a required length. In a tip end of the shaft 30, a threaded hole 31 to be screw-fitted to the threaded rod 183 is formed. At a rear end of the shaft 30, a holding portion 32 that is a rotary shaft connecting element and is gripped by a chuck 50 on a tip end portion of the rotary shaft (not shown) of the electric motor 5 is formed.

To a border portion between the shaft 30 and the holding portion 32, a rear portion bearing 33 is fixed. The rear portion bearing 33 is a ball bearing, and an outer diameter of an outer race of the rear portion bearing 33 is set to be slightly smaller than an inner diameter of a main pipe of the handle ease 4 to be described next, and the shaft 30 is rotatable in a state where the shaft 30 is fixed or substantially fixed to the inside of the main pipe.

(Handle Case 4)

The handle case 4 has a T-shaped case main body 40 shaped like a three-way joint. On an inner circumferential surface of a front portion side of the main pipe (pipe in the front-rear direction: shown without a reference symbol) of the case main body 40, a female threaded portion 400 is formed. A female threaded portion 401 is formed on an inner circumferential surface on a tip end side of a branched pipe (shown without a reference symbol) of the case main body 40.

In the branched pipe, a connecting pipe 41 serving as a suction pipe connecting element is screwed. On an outer circumferential surface on a tip end side of the connecting pipe 41, a male threaded portion 410 is formed. To the connecting pipe 41, a suction pipe 43 (shown in FIG. 8 to FIG. 11) leading to a suction pump (not shown) is connected by screwing a female threaded portion on a tip end portion to the male threaded portion 410.

To a front portion side of the case main body 40, an insertion cylinder member 42 is connected. The insertion cylinder member 42 includes a cylinder portion 420 on a tip portion side and a male threaded portion 421 on a rear portion side, and at a border portion between these, a hexagonal latch portion 422 for tightening is provided, An outer diameter of the cylinder portion 420 is set to be slightly smaller than an inner diameter of the joint hole 61, and can be fitted in the joint hole 61.

The insertion cylinder member 42 is connected to the case main body 40 by screwing the male threaded portion 421 into the female threaded portion 400. The handle case 4 is set on the extension shaft 3 by fitting the insertion cylinder member 42 connected to the case main body 4 0 and the main pipe of the case main body 40 to the extension shaft 3 and housing the rear portion bearing 33 inside the main pipe.

(Operation)

A method for forming spherical hole expansions 62 and 63 at two positions on an inner wall of the joint hole 61 of a joining wood material 6 by using the hole expansion forming device S and a method and structure for joining the joining wood materials 6 together are described with reference to FIG. 7 to FIG. 14.

Figure 7:
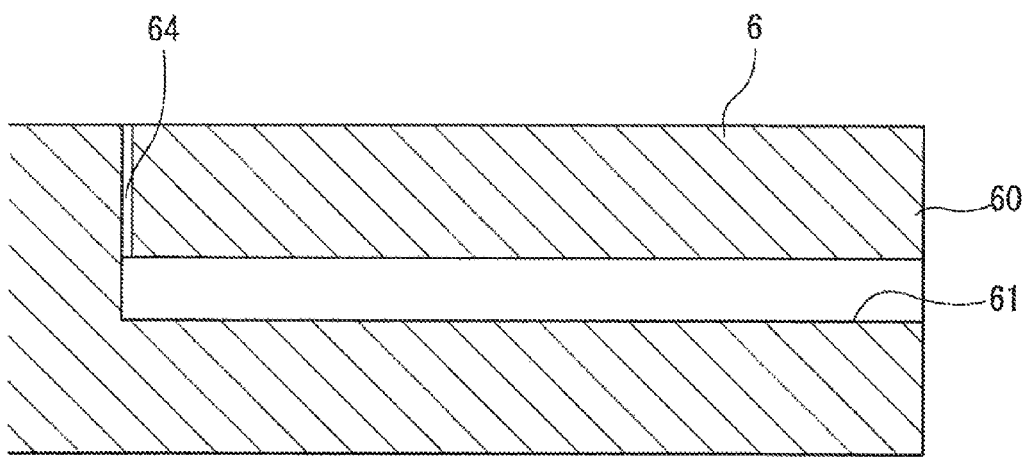
FIG. 7 is an explanatory view showing steps of a method for joining a joining wood material by using the hole expansion forming device in a state where a joint hole is opened in a butt end.

(1) As shown in FIG. 7, with a wood wimble (not shown), the joint hole 61 with a required depth is opened in a central axis direction of the butt end 60 of the joining wood material 6. An inner diameter of the joint hole 61 is slightly larger than the cutting portion main body 1 so that the cutting portion main body 1 can be inserted therein with no difficulty and no excess play, etc. Then, an adhesive agent injection hole 64 communicating with the inner end portion of the joint hole 61 is formed from an outer circumferential surface of the joining wood material 6.

Figure 8:
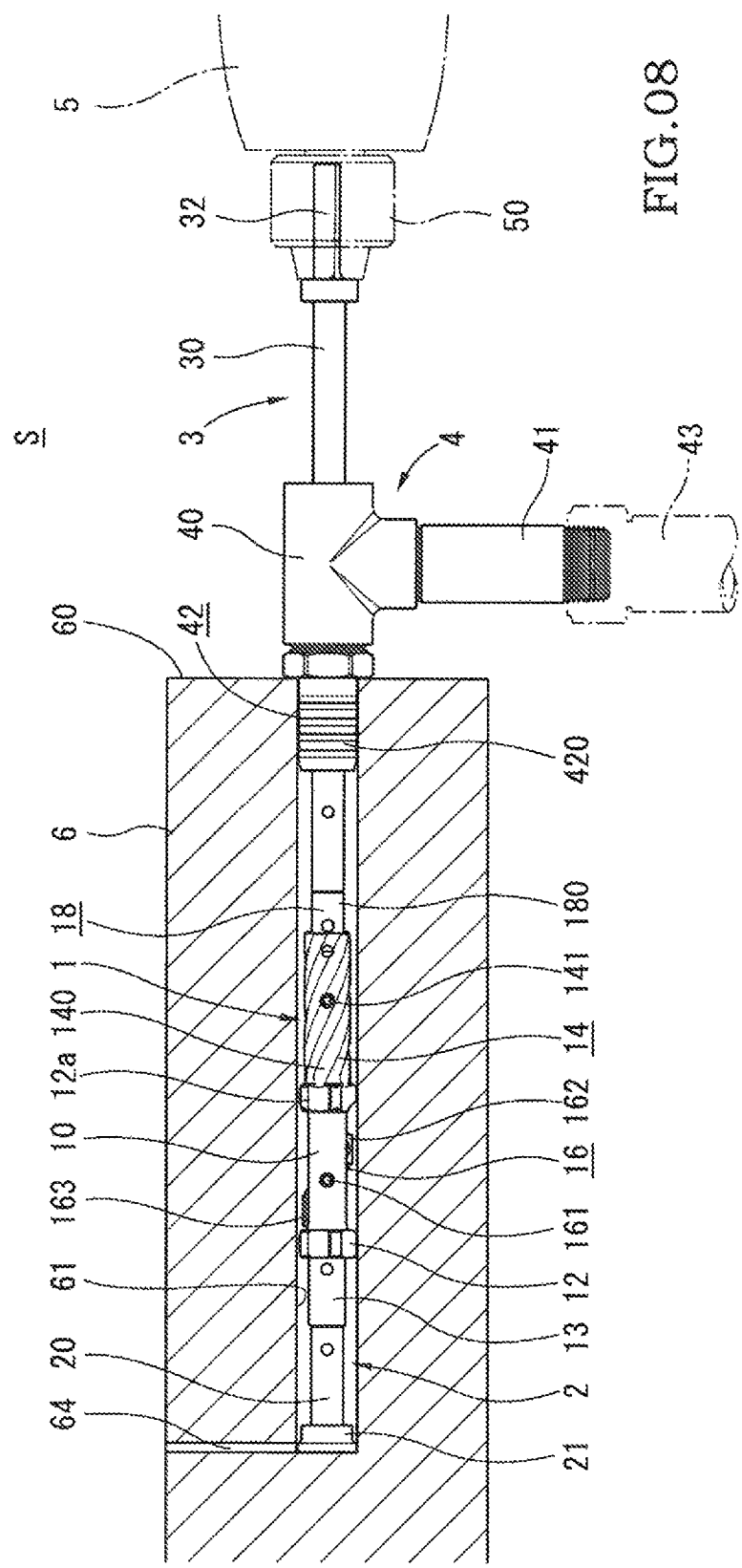
FIG. 8 is an explanatory view showing a state where the hole expansion forming device is inserted in the joint hole.

(2) By estimating a position of the hole expansion 62 to be formed in the joint hole 61 in advance, a depth adjusting adapter 2 with a length corresponding to the position is attached to a tip end of the cutting portion main body 1. Next, as shown in FIG. 8, the holding portion 32 of the extension shaft 3 of the hole expansion forming device S is held by the chuck 50 of the electric motor 5. To the connecting pipe 41 of the handle case 4, the suction pipe 43 leading to a suction pump is connected. Then, the hole expansion forming device S is inserted from the tip portion side into the joint hole 61, and the tip portion bearing 21 is brought into contact with the inner end portion of the hole. The cylinder portion 42 0 of the insertion cylinder member 42 connected to the handle case 4 is inserted in a hole mouth of the joint hole 61.

At this point in time, the respective blade bodies 162 and 163 of the cutting blade tool 16 are almost housed within the diameter of the housing body 10, that is, inside the housing space 11. Then, the suction pump is actuated to suction air inside the joint hole 61 through the handle case 4. The air to be suctioned is taken into the inside of the joint hole 61 from the adhesive agent injection hole 64.

Figure 9:
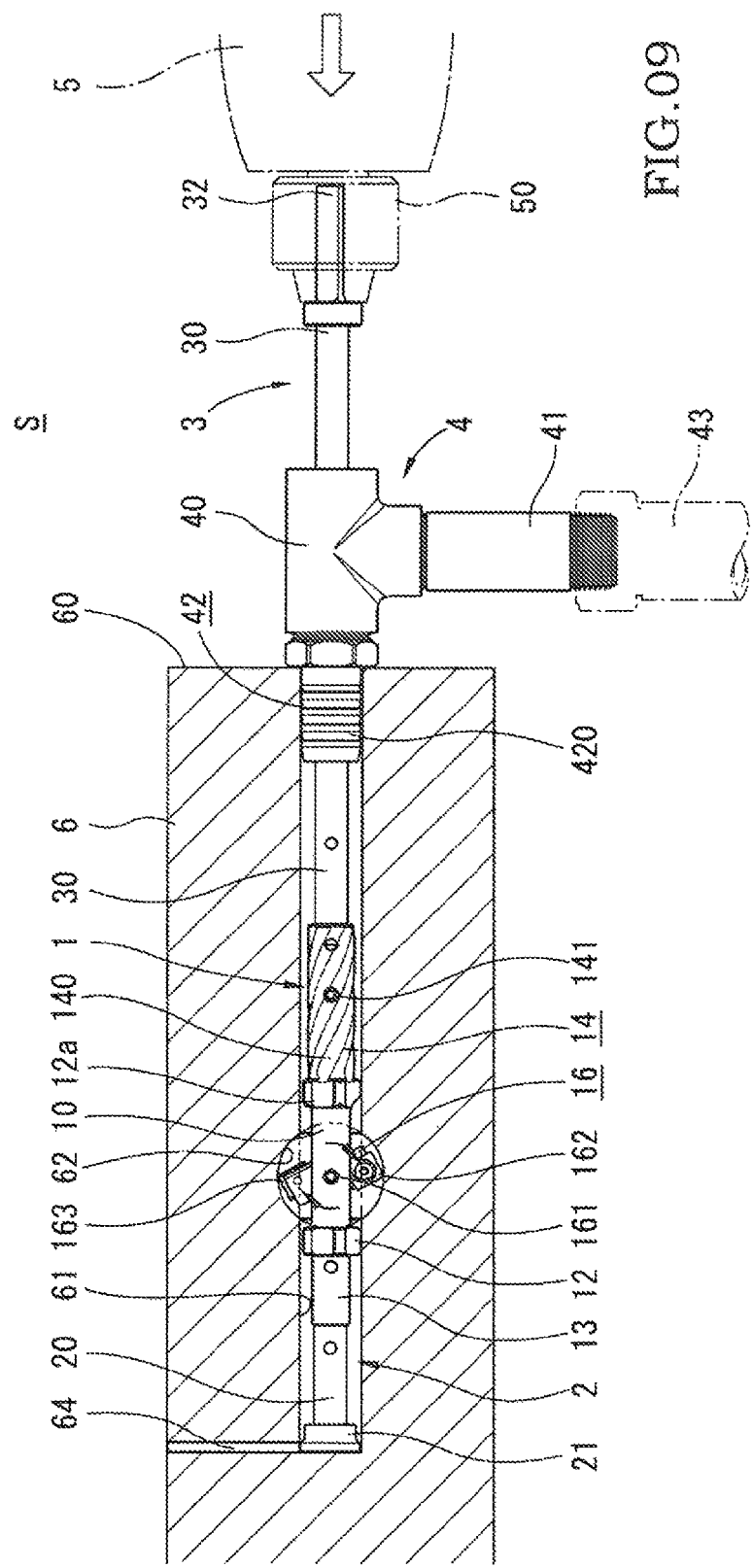
FIG. 9 is an explanatory view showing a state where a hole expansion is formed in the joint hole by the hole expansion forming device.

(3) Next, as shown in FIG. 9, the electric motor 5 is actuated to rotate the cutting portion main body 1 inside the joint, hole 61 via. the extension shaft 3. The cutting portion main body 1 is pivotally supported by the tip portion bearing 21 and the rear portion bearing 33 so as to rotate, and can stably rotate due to synergistic effect with a runout, prevention effect of the runout preventive portions 12 and 12*a*. Then, while rotating the cutting portion main body 1, by pushing and relaxing the electric motor 5, the advancing and retracting member 18 is advanced and retracted in a restricted stroke via the extension shaft 3. By relaxing the pushing force, a biasing force (repulsive force) of the coil spring 19 acts, and the advancing and retracting member 18 automatically retracts.

When the advancing and retracting member 18 is advanced and retracted as described above, the cutting blade tool 16 turns in a certain angle range (approximately 90°) around the shaft pin 161 by interlocking with advancing and retracting of the advancing and retracting member 18 via the link 17. That is, the respective blade bodies 162 and 163 of the cutting blade tool 16 move in the range from the housed position at which the blade bodies 162 and 163 are housed within the diameter of the housing body 10 (refer to FIG. 5(*a*)) to the position at which the blade bodies 162 and 163 project out of the diameter of the housing body 10 and define a maximum diameter (refer to FIG. 5(*b*)).

Accordingly, the inner wall of the joint hole 61 is cut by the respective blade bodies 162 and 163, and a hole expansion 62 that is a substantially spherical space portion is formed at the inner side. That is, in FIG. 9, a substantially right half of the hole expansion 62 is cut and formed by the blade body 162, and a substantially left half is cut and formed by the blade body 163. When the hole expansion 62 is formed, resistances to the respective blade bodies 162 and 163 are eliminated, and the operating sound changes, so that it can be easily confirmed that the hole expansion 62 has been formed.

The cutting blade tool 16 is structured so as to be moved via the link 17, and movement such as turning, etc., of the cutting blade tool 16 is smoothly performed. By interposing the link 17 between the cutting blade tool 16 and the advancing and retracting member 18, the movement of the advancing and retracting member 18 is always reflected in movement of the cutting blade tool 16, so that the conventional bumpy movement does not occur, and the movement of the blade bodies 162 and 163 in the rotating direction when cutting can be stabilized.

The cutting blade tool 16 performs cutting by rotating the respective blade bodies 162 and 163 in a direction crossing a wood fibrous direction of the joining wood material 6 while turning around the shaft pin 161, so that chips produced by cutting of the hole expansion 62 are fine chips with comparatively short wood fibers. Such chips are suctioned by the suction pipe 43 through the joint hole 61 and the inside of the handle case 4 together with air even during a cutting work, and efficiently discharged to the outside of the joint hole 61 and collected.

Accordingly, chips do not stay long in the joint hole 61 and do not obstruct cutting formation of the hole expansion 62, so that the cutting work can be smoothly performed, and chips do not scatter at the working area and fine particles of chips are not dispersed in the air, so that an excellent work environment can be maintained.

(4) Thereafter, the electric motor 5 is stopped, and the hole expansion forming device S is temporarily removed from the joint hole 61. In a state where pushing of the advancing and retracting member 18 is relaxed, the cutting blade tool returns so that the respective blade bodies 162 and 163 are housed in the housing space 11, so that they do not become an obstacle, and the hole expansion forming device S can be easily removed. Then, by estimating a position of the hole expansion 63 to be formed next in the joint hole 61, the depth adjusting adapter 2 is replaced with a depth adjusting adapter 2a (refer to FIG. 10 and FIG. 11) corresponding to the estimated position.

Figure 10:
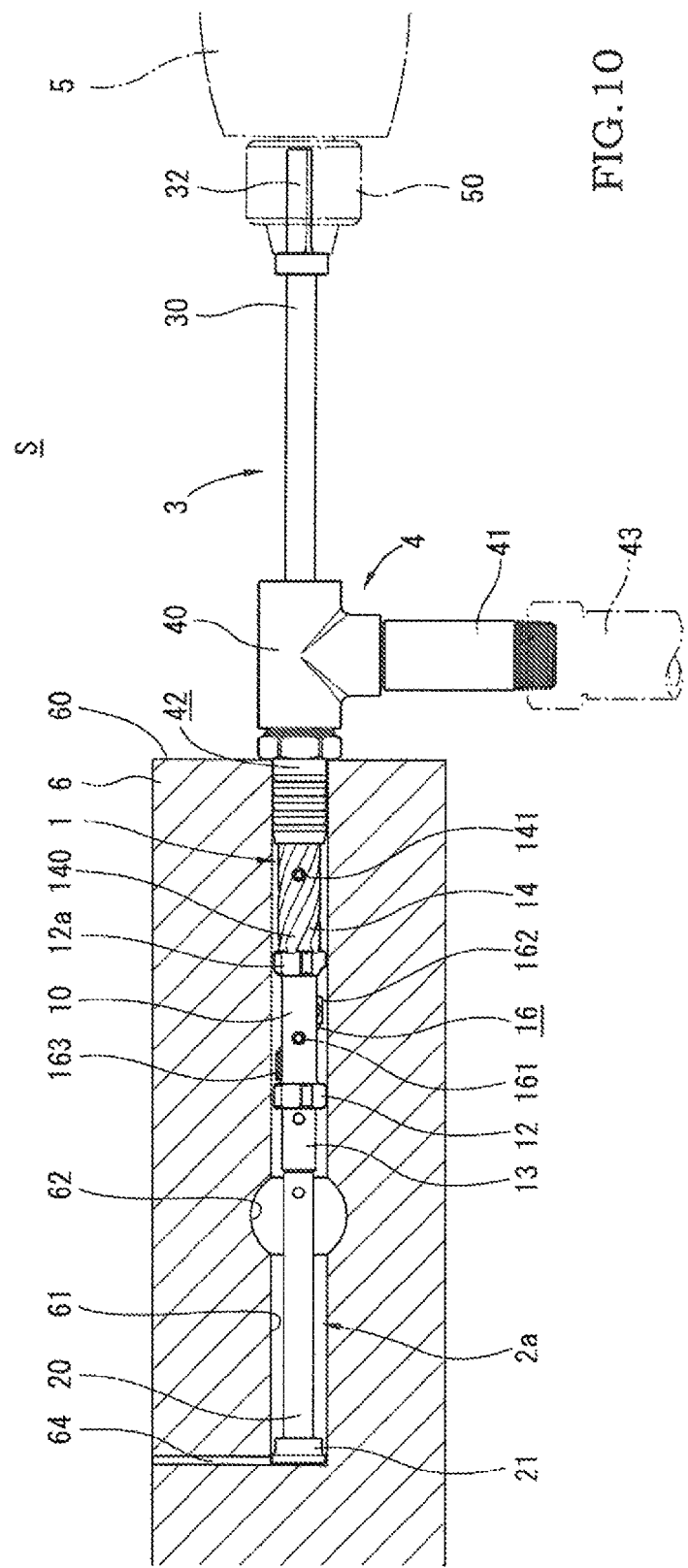
FIG. 10 is an explanatory view showing a state where the hole expansion forming device is set so that the cutting blades are set at a position at which a second hole expansion is formed.

(5) Next, as shown in FIG. 10, the hole expansion forming device S is inserted again in the joint hole 61, and the tip portion bearing 21 on a tip end of the depth adjusting adapter 2a is brought into contact with the inner end portion of the hole. Accordingly, the position of the cutting blade tool 16 slightly deviates from the position at which the hole expansion 62 was cut to a hole exit side of the joint hole 61.

Figure 11:
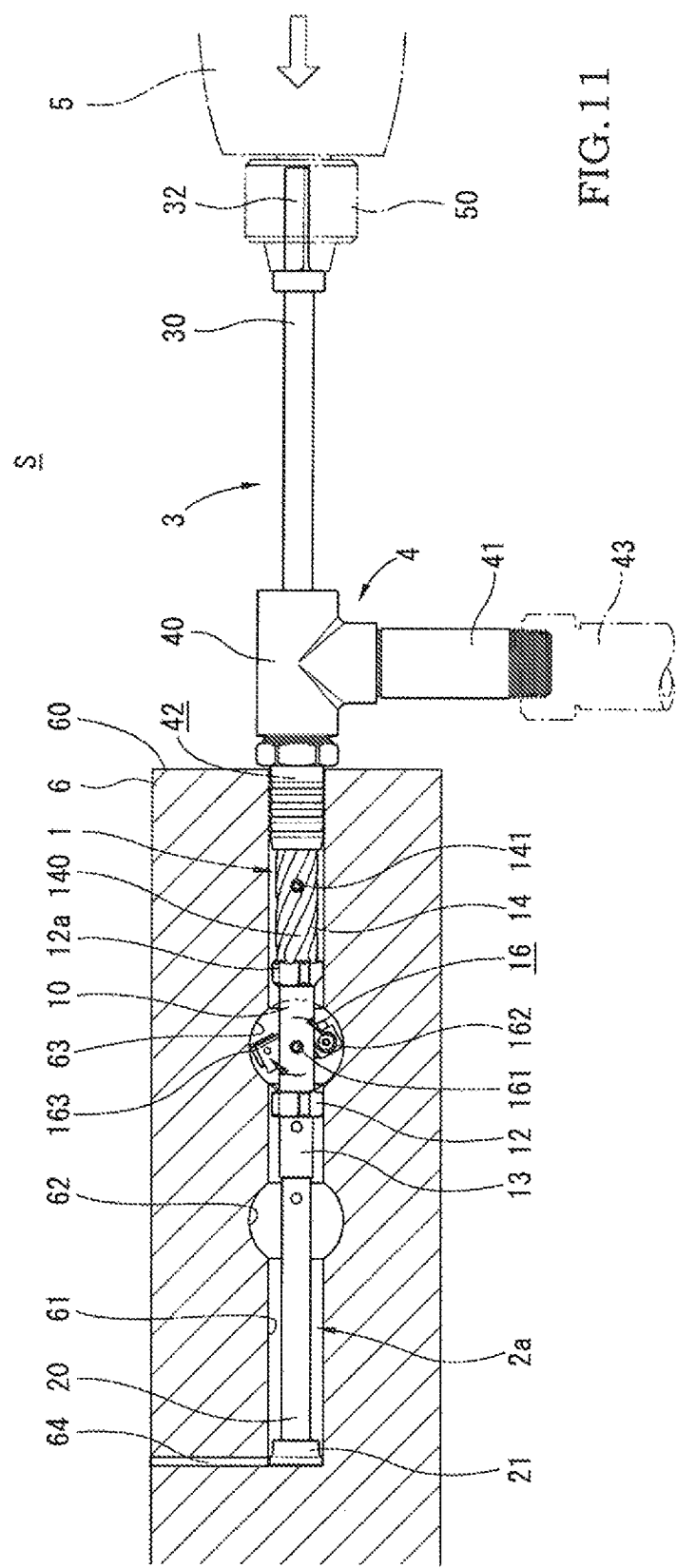
FIG. 11 is an explanatory view showing a state where the second hole expansion is formed in the joint hole by the hole expansion forming device.
Figure 12:
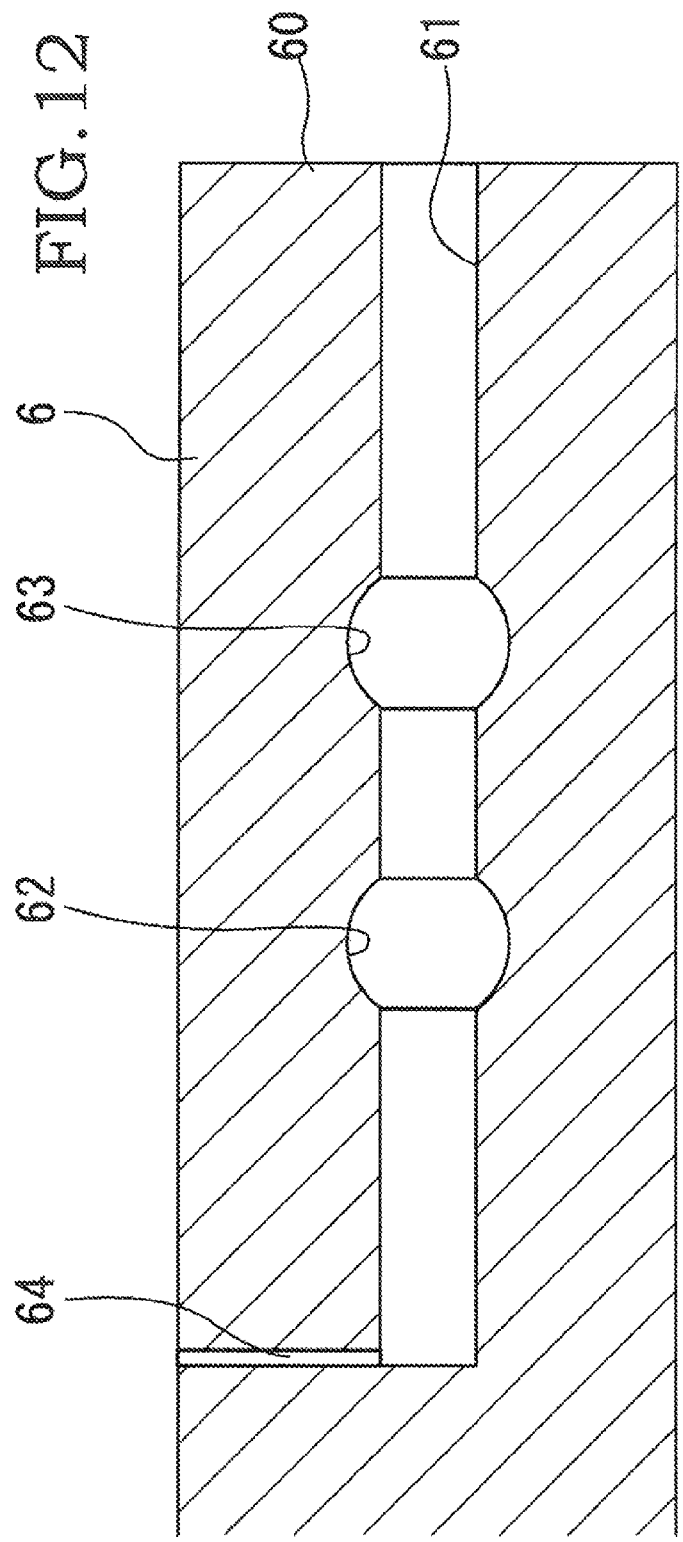
FIG. 12 is an explanatory view showing a state where hole expansions are formed at two positions in the joint hole.

(6) Next, as shown in FIG. 11, the electric motor 5 is actuated in the same manner as when cutting the hole expansion 62, and the spherical hole expansion 63 is formed adjacently to the hole expansion 62 of the joint hole 61 at a required interval. Thereafter, the electric motor 5 is stopped, and the hole expansion forming device S is removed from the joint hole 61. Accordingly, a joining wood material 6 with hole expansions 62 and 63 having spherical space portions formed at two positions on the inner wall of the joint hole 61 as shown in FIG. 12 can be manufactured.

Figure 13:
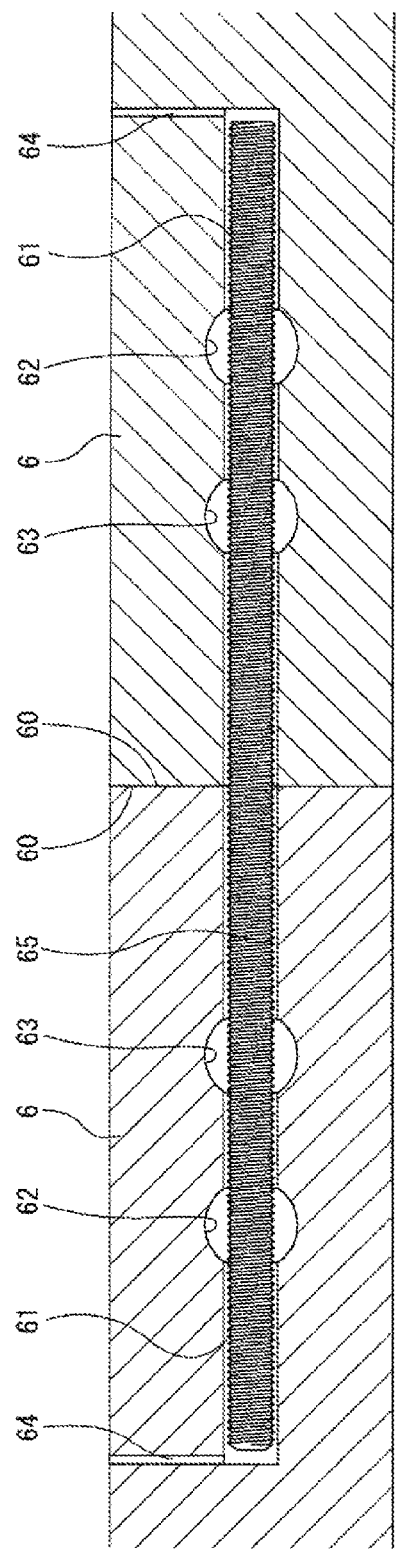
FIG. 13 is an explanatory view showing a state where butt ends of two joining wood materials are butted against each other and a threaded rod is housed in and across respective joint holes of the joining wood materials.

(7) Further, as shown in FIG. 13, joining wood materials 6 having the same structure obtained in the same manner as described above are disposed so that their butt ends 60 face each other, and a threaded rod 65 made of a metal is inserted in and across the joint holes 61 of the joining wood materials 6. A length of the threaded rod 65 is nearly the same as a length of the respective joint holes 61 connected to each other, and is set so that the threaded rod 65 is only housed in both joint holes 61 when the butt ends 60 of the respective joining wood materials 6 are butted against each other. An outer diameter of the threaded rod 6 5 is set to be slightly smaller than an inner diameter of the joint hole 61 so that a gap (shown without a reference symbol) through which a resin-made adhesive agent 66 passes is formed between the joint hole 61 and the threaded rod 65.

Figure 14:
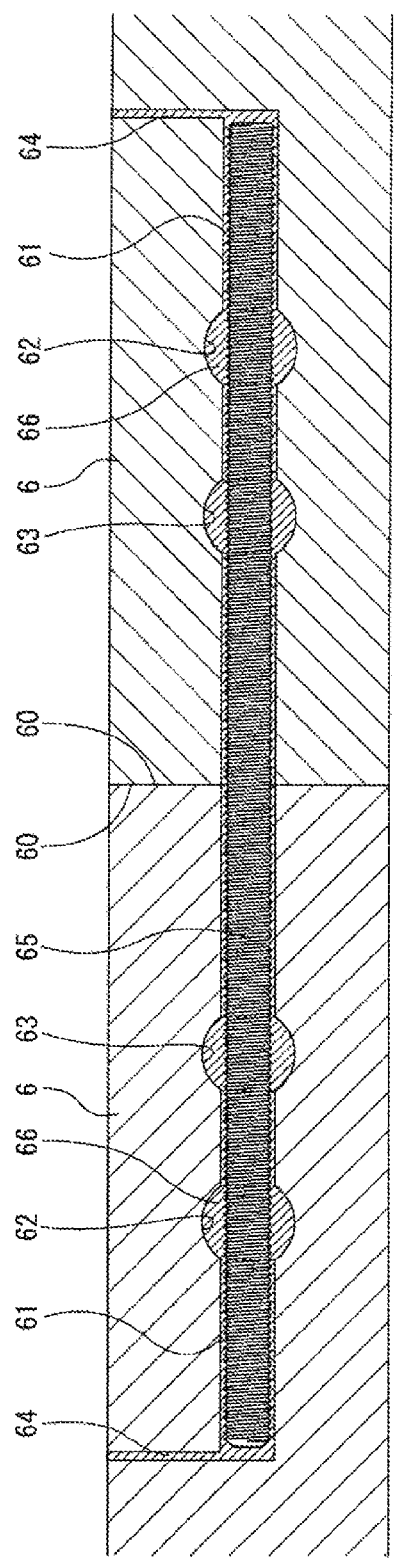
FIG. 14 is an explanatory view showing a state where an adhesive agent is injected in the respective joint holes.

(8) Then, as shown in FIG. 14, in the state where the butt ends 60 of the respective joining wood materials 6 are butted against each other, the adhesive agent 66 is injected from the resin injection hole 64 of one joining wood material 6 to fill the gaps between the joint holes 61 and the threaded rod 65 and a total of four hole expansions 62 and 63, in the joint hole 61. When the adhesive agent 66 comes out from the resin injection hole 64 of the other joining wood material, injection of the adhesive agent 66 is stopped. Thereafter, by curing the adhesive agent 66, inside each joint hole 61, the adhesive agent 66 is integrated with the threaded rod 65 and becomes a very strong joint member, and can firmly join the joining wood materials 6 together.

DESCRIPTION OF REFERENCE SYMBOLS

S Hole expansion forming device
1 Cutting portion main body
10 Housing body
11 Housing space
12, 12a Runout preventive portion
120 Recess
13 Tip portion connecting shaft
130 Threaded hole
14 Cylinder
140 Spiral groove portion
141 Guide pin
142 Through hole
143 Inner diameter portion
16 Cutting blade tool
160 Turning body
161 Shaft pin
162, 163 Blade body
164 Screw
17 Link
171 Shaft pin
18 Advancing and retracting member
180 Large-diameter portion
181 Small-diameter portion
182 Slide hole
183 Threaded rod
19 Coil spring
2, 2a Depth adjusting adapter
20 Shaft rod
21 Tip portion bearing
22 Threaded rod
3 Extension shaft
30 Shaft
31 Threaded hole
32 Holding portion
33 Rear portion bearing
4 Handle case
40 Case main body
400 Female threaded portion
401 Female threaded portion
41 Connecting pipe
410 Male threaded portion
42 Insertion cylinder member
420 Cylinder portion
421 Male threaded portion
422 Latch portion
43 Suction pipe
5 Electric motor
50 Chuck
6 Joining wood material
60 Butt end
61 Joint hole
62, 63 Hole expansion
64 Adhesive agent injection hole
65 Threaded rod
66 Adhesive agent

The invention claimed is:

1. A hole expansion forming device comprising:
a cutting portion main body formed to have a diameter for the cutting portion main body to be housed in a joint hole (61) and including a cutting blade tool movable in a range between a housed position at which a blade is housed within the diameter of the cutting portion main body and an extended position at which the blade projects out of the diameter of the cutting portion main body, an advancing and retracting member that is constructed to move in an axial direction by an external force and rotate about an axis of the advancing and retracting member, and a link mechanism that converts an advancing and retracting movement of the advancing and retracting member into a rotational movement of the cutting blade tool;
a tip portion bearing that is provided on a tip end of the cutting portion main body and serves as a tip end side bearing when being housed in an inner portion of the joint hole; and a torque transmitting element to transmit a torque about the axis of the advancing and retracting member to the advancing and retracting member.

2. The hole expansion forming device according to claim 1, wherein the cutting blade tool has blades on both ends, in a longitudinal direction and rotates around a turning center of an intermediate portion.

3. The hole expansion forming device according to claim 1, wherein the advancing and retracting member includes a biasing body that biases the cutting blade tool, interlocked with the advancing and retracting member, in a direction to make the blade being housed within the diameter of the cutting portion main body.

4. The hole expansion forming device according to claim 1, comprising:
   a spiral groove portion whose spiral direction is a discharging direction on an outer circumferential portion of the cutting portion main body.

5. The hole expansion forming device according to claim 1, wherein a runout preventive portion, having a diameter smaller than that of the joint hole and larger than that of other portions of the cutting portion main body, is formed on an outer circumferential portion of the cutting portion main body.

6. The hole expansion forming device according to claim 1, wherein the tip portion bearing is constructed to be attached to a depth adjusting adapter selected from a plurality of depth adjusting adapters, which are attachable to and removable from a tip end of the cutting portion main body, having different lengths.

7. The hole expansion forming device according to claim 1, wherein the torque transmitting element includes an extension shaft having a rotary shaft connecting element which is connectable to the advancing and retracting member of the cutting portion main body and to which a rotary shaft of an electric motor is connected.

8. The hole expansion forming device according to claim 1, wherein the torque transmitting element includes an extension shaft, having a rotary shaft connecting element which is connectable to the advancing and retracting member of the cutting portion main body and to which a rotary shaft of an electric motor is connected, and a rear portion bearing that pivotally supports the extension shaft itself rotatably.

9. The hole expansion forming device according to claim 1, comprising:
   a handle case that directly or indirectly pivotally supports rotation of the cutting portion main body, and the handle case has a cylinder portion that can be fitted in the joint hole and a suction pipe connecting element to which a suction pipe to suction air and chips inside the joint hole through the cylinder portion is connected.

* * * * *